(12) United States Patent
Moyer

(10) Patent No.: US 8,856,587 B2
(45) Date of Patent: Oct. 7, 2014

(54) CONTROL OF INTERRUPT GENERATION FOR CACHE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 396 days.

(21) Appl. No.: 13/149,217

(22) Filed: May 31, 2011

(65) Prior Publication Data

US 2012/0311379 A1     Dec. 6, 2012

(51) Int. Cl.
*G06F 11/00* (2006.01)
*G06F 12/08* (2006.01)

(52) U.S. Cl.
CPC ........ *G06F 12/084* (2013.01); *G09G 2360/121* (2013.01)
USPC ............... 714/6.1; 714/6.2; 714/34; 714/6.11

(58) Field of Classification Search
CPC .................. G06F 12/084; G09G 2360/121
USPC .................... 714/6.1, 6.11, 6.2, 6.22, 6.24
See application file for complete search history.

(56) References Cited

U.S. PATENT DOCUMENTS

| | | | |
|---|---|---|---|
| 4,825,412 A | 4/1989 | Sager et al. | |
| 4,996,641 A | 2/1991 | Talgam et al. | |
| 5,353,425 A | 10/1994 | Malamy et al. | |
| 6,918,071 B2 | 7/2005 | Cherabuddi et al. | |
| 7,228,386 B2 | 6/2007 | Rowlands et al. | |
| 7,380,180 B2 | 5/2008 | Valine | |
| 7,827,360 B2 | 11/2010 | Rahman et al. | |
| 2002/0046326 A1 | 4/2002 | Devereux | |
| 2007/0022250 A1* | 1/2007 | Fields et al. | 711/133 |
| 2009/0307538 A1* | 12/2009 | Hernandez et al. | 714/54 |
| 2010/0058109 A1 | 3/2010 | Chang et al. | |
| 2011/0047334 A1* | 2/2011 | Eichenberger et al. | 711/141 |

OTHER PUBLICATIONS

Office Action—NFOA Aug. 5, 2013, 13 pgs (892).
U.S. Appl. No. 13/149,304, filed May 31, 2011, entitled "Cache Locking Control,".
Final Office Action mailed Dec. 10, 2013 for U.S. Appl. No. 13/149,304, 15 pages.
Notice of Allowance mailed Feb. 25, 2014 for U.S. Appl. No. 13/149,304, 8 pages.

* cited by examiner

*Primary Examiner* — Sarai Butler

(57) ABSTRACT

A data processing device includes a cache having a plurality of cache lines. Each cache line has a lockout state that indicates whether an error has been detected for data accessed at the cache line. The lockout state of a cache line is indicated by a set of one or more lockout bits associate with the cache line. When a cache line is in a locked-out state, the cache line is not used by the cache. Accordingly, a locked-out cache line is not employed by the cache to satisfy a cache accesses, and is not used to store data retrieved from memory in response to a cache miss. In response to determining the detected error likely did not result from a hardware failure or other persistent condition, memory error management software can reset the lockout state of the cache line.

20 Claims, 4 Drawing Sheets

| TAG | VALID BIT | LOCKOUT BITS | OTHER CONTROL BITS | DATA |
|---|---|---|---|---|
| 231 | 232 | 233 | 234 | 235 |

| ERROR DETECTION ENABLE BITS | LOCKOUT CONTROL BITS | LOCKOUT RESET POLICY BITS | VB RESET POLICY BITS | OTHER CONTROL BITS |
|---|---|---|---|---|
| 341 | 342 | 343 | 344 | 345 |

CONTROL OF INTERRUPT GENERATION FOR CACHE

CROSS-REFERENCE TO RELATED APPLICATION

The present application is related to U.S. patent application Ser. No. 13/149,304, entitled, "CACHE LOCKING CONTROL" filed on an even date herewith, the entirety of which is incorporated by reference herein.

FIELD OF THE DISCLOSURE

The present disclosure relates generally to data processing devices, and more particularly to caches for data processing devices.

BACKGROUND

A data processing device typically employs a cache for storage and retrieval of recently accessed information. However, information stored in the cache can be stored or retrieved in an erroneous state due to hard errors, resulting from a defective storage cell, or soft errors, such as errors resulting from alpha particle disruption or marginal operation of a storage cell. To protect against such errors, the data processing device can employ an error protection module that detects, and in some cases corrects, errors in information retrieved from the cache. In addition, the data processing device can employ a lockout scheme, whereby cache lines for which errors have been detected are rendered inaccessible.

BRIEF DESCRIPTION OF THE DRAWINGS

The present disclosure may be better understood, and its numerous features and advantages made apparent to those skilled in the art by referencing the accompanying drawings.

FIG. 2 is a diagram of a cache line of the cache of FIG. 1 in accordance with one embodiment of the present disclosure.

FIG. 3 is a diagram of the cache control register of FIG. 1 in accordance with one embodiment of the present disclosure.

DETAILED DESCRIPTION

FIGS. 1-5 illustrate example techniques for managing the lockout state for each cache line of a cache at a data processing device. Each cache line has a lockout state that indicates whether an error has been detected for data accessed at the cache line. The lockout state of a cache line is indicated by a set of one or more lockout bits associate with the cache line. When a cache line is in a locked-out state, the cache line is not used by the cache. Accordingly, a locked-out cache line is not employed by the cache to satisfy a cache accesses, and is not used to store data retrieved from memory in response to a cache miss. In response to determining the detected error likely did not result from a hardware failure or other persistent condition, memory error management software can reset the lockout state of the cache line (so that the cache line can be used by the cache).

A programmable register indicates a lockout policy that controls whether the lockout bits are placed in the lockout state when an error is detected at the cache line. The lockout policy also controls whether an interrupt is generated when the lockout bits are placed in the lockout state. The lockout policy can be adjusted by programming the register with different values, allowing the data processing device to flexibly implement different approaches to memory error management.

To illustrate, in some devices it is useful for a processor unit to be immediately notified, via an interrupt, that a cache line has been placed in a locked-out state. This allows the processor unit to take quick action to address potentially critical errors at the cache. In other devices, memory error management software can detect hardware failures at the cache by periodically polling the lockout indicators at designated intervals to determine which accessed cache lines have resulted in detected errors. In such devices, immediate notification that a cache line has been placed in the locked-out state may be less useful, and may have an undesirable impact on device performance. A programmable lockout policy allows software to set whether an interrupt is generated when a cache line is locked out, depending on the type of device or other criteria.

Figure 1:
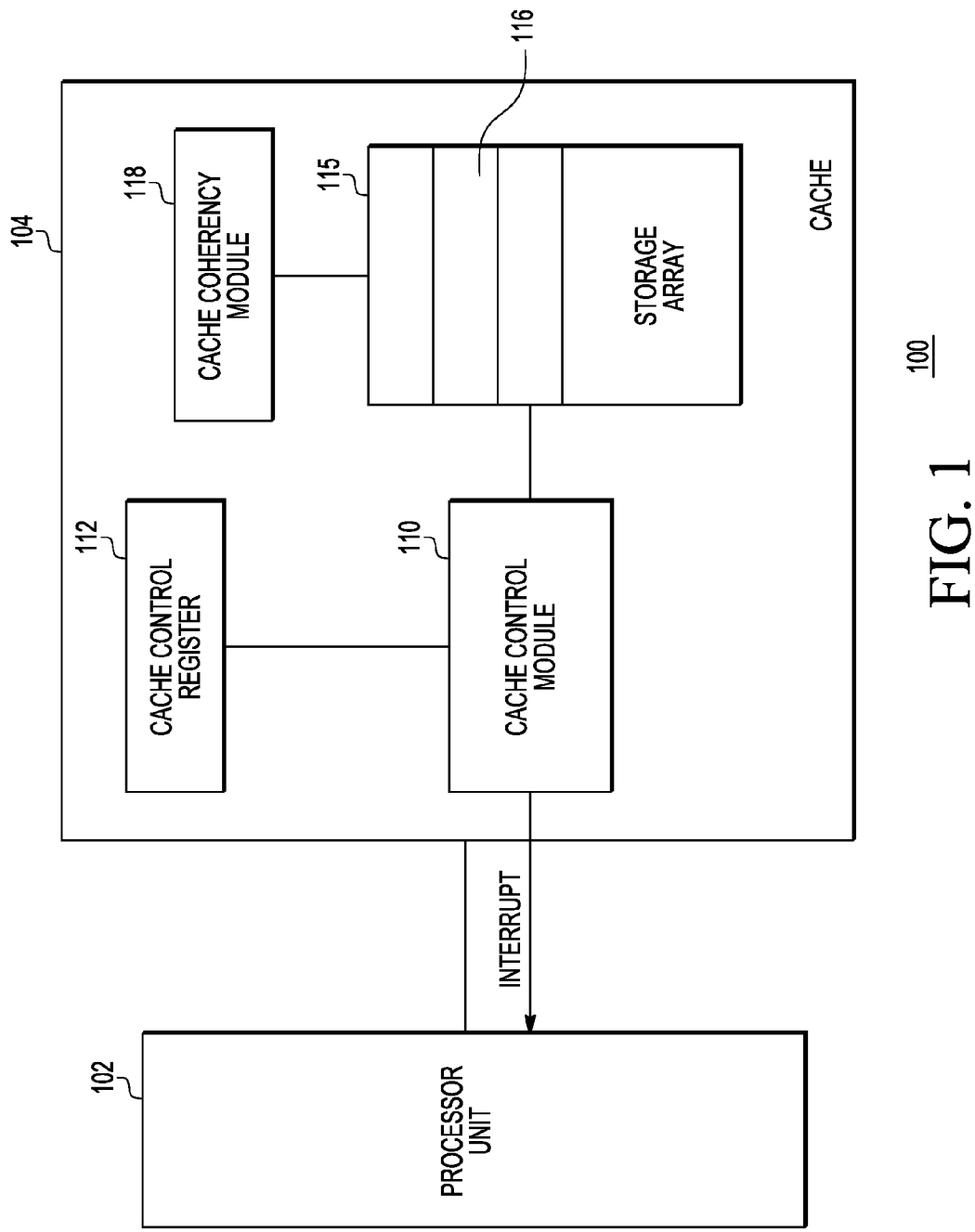
FIG. 1 is a block diagram illustrating a data processing device in accordance with a specific embodiment of the present disclosure.

FIG. 1 illustrates a data processing device 100 in accordance with one embodiment of the present disclosure. In the embodiment illustrated at FIG. 1, the data processing device 100 is a general purpose data processing device that can be incorporated into an electronic device, such as a portable electronic device, computer devices, automotive device, and the like. The data processing device 100 is generally configured to decode a set of instructions into one or more operations, and execute the operations in order to perform tasks associated with the electronic system. For example, the data processing device 100 can be incorporated in a mobile telephone device, and execute sets of instructions to send and receive phone calls, access the Internet, send and receive text messages, and the like.

Referring again to FIG. 1, the data processing device 100 includes a processor unit 102 connected to a cache 104. It will be appreciated that the data processing device 100 can also included additional modules not illustrated at FIG. 1, including additional caches, system memory, interconnects, input/output interfaces, and the like.

The processor unit 102 is a module configured to decode processor instructions into one or more operations and execute the operations in order to perform the functions of the data processing device 100. For example, in one embodiment the data processing device 100 is part of an automobile control system, and the processor unit 102 executes operations to control aspects of the automobile's functions, such as detection of automobile conditions, management and control of different automotive features, and the like.

An example operation that can be executed by the processor unit 102 is referred to as a memory access, whereby the processor unit 102 provides data to be transferred to a memory device (a write access) or requests data to be transferred from the memory device to the unit (a read access). The cache 104 is configured to store and retrieve data in response to write accesses and read accesses, respectively. Read and write accesses provided to the cache are collectively referred to as cache accesses. In response to a cache access, the cache 104 decodes address information associated with the access and determines whether it currently contains valid information associated with the address information. If so, the cache 104 performs the operation designated by the cache access, such as modifying stored data (in the case of a write access) or providing the stored data to the processor unit 102 (in the case of a read access). In the event that the cache 104 does not store information associated with the address information, it can retrieve the information from other caches (not shown) or system memory (not shown) in response to the cache access.

The cache 104 includes a cache control module 110, a cache control register 112, a storage array 115, and a cache coherency module 118. The storage array 115 is a set of storage locations, referred to as cache lines, that store and provide information for the cache 104 in response to write and read accesses. An example cache line 116 is illustrated at FIG. 2. In the illustrated embodiment, the cache line 116 includes a tag field 231, a valid bit 232, lockout bits 233, other control bits 234, and data 235. The tag field 231 indicates the tag value that identifies the data stored at the cache line 225. The tag value is based on the memory address associated with the data. The data 235 stores the data associated with the memory location indicated the tag field 231. In an embodiment, the data 235 includes 4 double words of data.

The state of the valid bit 232 indicates whether the cache line 116 stores valid data or invalid data. Cache lines storing invalid data are assumed to store data that differs from data stored at a memory location corresponding to the tag value stored at tag field 231. Accordingly, a cache line storing invalid data is not used to satisfy processor accesses. Further, in contrast to a locked-out cache line, a non-locked out cache line that stores invalid data is eligible for replacement in response to a cache miss. In an embodiment, the valid bit 232 is set to the invalid state in response to a reset event at the data processing device 100, and is set to the valid state when the cache line is allocated and filled in response to a cache miss. The valid bit 232 can be cleared to the invalid state in response to the cache 104 receiving memory coherency information indicating that the data associated with the cache line 116 has been modified at another cache or other memory module of the data processing device 100.

The state of the lockout bits 233 indicate whether the cache line 116 is in a locked-out state. As described further herein, the cache 104 is configured so that locked-out cache lines are not used to satisfy cache accesses, and are not used to store data retrieved from memory in response to a cache miss. For example, in an embodiment cache lines in the locked-out state are prevented from resulting in cache hits. In other words, the cache 104 will not indicate, based on a cache line in a locked-out state, that the cache line stores data associated with an access, even if the tag field for the cache line would otherwise result in a cache hit. In an embodiment, the lockout bits 233 includes a set of redundant bits, whereby the redundant bits are each set to the same state in order to indicate the locked-out state of the cache line 116. By employing redundant bits, the lockout bits 233 are more robust and resistant to hard or soft errors and the possible indication of an incorrect lockout state for the cache line 116.

The other control bits 234 store other control information for the cache line 116, such as additional coherency bits, protection bits, security information, ECC codes, and the like. In an embodiment, the cache 100 is an N-way set associative cache, where N is an integer, and different ways of the cache can store different types of control information at the control bits 234. For example, in one embodiment the first way of a cache set can store a replacement flag in the additional control bits to indicate whether the cache set is eligible for replacement. The replacement flag is not stored at the other control bits of the other ways in the cache set.

Returning to FIG. 1, the cache control module 110 is configured to control access to the cache 104. In particular, the cache control module 110 receives address information associated with read and write accesses, decodes the address information to determine a tag, and determines based on the tag whether a non-locked out cache line of the cache 104 stores valid data associated with the address. If so, the cache control module 110 determines a cache hit and satisfies the access at the cache 104 by modifying the data (in the case of a write access) or providing the data to the processor unit 102 (in the case of a read access). If the cache 104 does not store valid data associated with the address at a non-locked out cache line, the cache control module 110 determines a cache miss and requests that the data associated with the address be retrieved from another cache or system memory for storage at the cache 104.

The cache control module 110 can also perform error detection and error correction operations for accesses to the cache. For example, for each write access to a cache line, the cache control module 110 can determine a set of ECC checkbits based on the data to be stored at the cache line and store the set of checkbits at the cache line. For each read access that results in a cache hit, the cache control module 110 can retrieve the set of ECC checkbits for the cache line and perform error detection and (if necessary) error correction on the data stored at the cache line.

The cache control module 110 can also determine, in response to detecting an error, that the detected error is uncorrectable. Depending on the lockout policy, in response to detecting an error the cache control module 110 can maintain the lockout state of the cache line in its present state, can set the state of the cache line to the locked-out state, or can set the state of the cache line to the locked-out state only for errors that are determined to be uncorrectable.

In an embodiment, the cache control module 110 can determine whether a detected error is associated with the cache line's tag information or with data stored at the cache, and determine whether to lock out the cache line (by setting the state of the lockout bits for the cache line to indicate a locked-out state) based on whether the detected error is associated with the tag information or the data. In addition, the cache control module 110 can recycle an access for which an error is detected by attempting the access again, following an attempt to correct the error and update the cache line with the corrected information. For recycled accesses, the cache control module 110 can maintain the cache line in an unlocked state in response to detecting the error on the initial access, and lockout the cache line in response to detecting the error again for the recycled access, thereby determining that the attempted correction of information in the cache line was not successful.

The cache control module 110 also determines, based on the lockout policy, whether to generate an interrupt in response to an error being detected. If an interrupt is generated, the processor unit 102 can respond by executing an exception handler or other interrupt service routine. In an embodiment, the cache control module 110 generates a machine-check interrupt.

The cache control module 110 can also modify the state of the lockout bits for a cache line based on instructions executing at the processor unit 102. This allows memory error management software executing at the processor unit 102 to manage the locked-out state of each cache line.

For a cache access resulting in a cache miss, the cache 104 receives data associated with the access from another cache or system memory. The cache control module 110 determines, based on a cache replacement policy, at which cache line of the cache 104 the received data is to be stored. In an embodiment, the cache control module 110 implements a cache replacement policy such that cache lines storing invalid data (as indicated by the valid bit for the cache line) are replaced before cache lines storing valid data. If all cache lines store valid data, the cache control module 110 replaces cache lines according to a least-recently-used policy.

In addition, the cache control module 110 can manage the state of each cache line in response to a cache invalidation event, such as a cache invalidation instruction, a hard reset, soft reset, or other reset of the data processor device 100. To illustrate, in response to a cache invalidation event the cache can set the valid bit for each cache line to an invalid state, thereby invalidating the contents of the cache. In addition, the cache control module 110 can implement a lockout-bit reset policy that determines whether the lockout bits for each cache line are reset (to indicate that each cache line is in a non-lockout state) or maintained in the state the bits had when the cache invalidation event was indicated.

The operations of the cache control module 110 can be controlled by programming the cache control register 112, a particular embodiment of which is illustrated at FIG. 3. In the illustrated embodiment, the cache control register 112 stores error detection enable bits 341, lockout control bits 342, lockout policy reset bits 343, valid bit reset policy bits 344, and other control bits 345. The error detection enable bits 341 indicate whether error detection and correction is enabled at the cache 104. If error detection is enabled, the cache control module 110 will perform error detection and (if necessary) error correction for each access to the cache.

The lockout control bits 342 control how the cache 104 responds to errors detected in response to accesses. In an embodiment, the lockout control bits 342 set the lockout control policy according to the following table:

| Bit States | Policy |
| --- | --- |
| 00 | Cache line lockout is disabled (lockout bits are ignored on cache accesses) |
| 01 | Cache line lockout is enabled. If an error is detected at a cache line in response to an access, the lockout bits for the cache line are placed in the locked-out state. An interrupt is not generated by the cache control module in response to the error. |
| 10 | Cache line lockout is enabled. If an error is detected at a cache line in response to an access, the lockout bits for the cache line are placed in the locked-out state. An interrupt is generated by the cache control module in response to the error. |
| 11 | Cache line lockout is enabled. If an error is detected at a cache line in response to an access, the lockout bits for the cache line are placed in the locked-out state only if the error is uncorrectable (e.g. an error is detected at multiple bit locations). For correctable errors, the cache access that resulted in the error is recycled and, if an error is detected in response to the recycled access, the lockout bits for the cache line are placed in the lockout state for any error (e.g. for both correctable an uncorrectable errors). An interrupt is not generated by the cache control module in response to the error. |

The lockout reset policy bits 343 indicate the lockout reset policy for the cache 104. If the lockout reset policy is a first policy, referred to as an invalidate policy, the lockout bits for each cache line are reset to indicate a non-locked-out state in response to a cache invalidation event at the data processor device 102. If the lockout reset policy is a second policy, referred to as a protect policy, the lockout bits for each cache line are not reset to indicate a non-locked out state in response to the cache invalidation event. In an embodiment, the cache control module 110, in response to a reset event, can reset the lockout reset policy bits 343 to an initial state. For example, in one embodiment the lockout reset policy bits are reset to the protect policy after a cache invalidation event. Accordingly, in this embodiment, the lockout reset policy defaults to the protect policy after each cache invalidation event to ensure that the lockout state for each cache line is not inadvertently changed in response to successive cache invalidation events.

The valid bit (VB) reset policy bits 344 indicate the valid bit reset policy for the cache 104. If the VB reset policy is a first policy, referred to as an invalidate policy, in response to a cache invalidation event at the data processor device 102 the valid bit for each cache line is reset to indicate invalid data is stored at each cache line. If the VB reset policy is a second policy, referred to as a protect policy, the valid bit for each cache line is not reset to indicate an invalid state in response to the cache invalidation event. In an embodiment, the cache control module 110, in response to a cache invalidation event, can reset the VB reset policy bits 344 to an initial state. For example, in one embodiment the VB reset policy bits 344 are reset to the protect policy after a cache invalidation event.

The other control bits 345 are employed to control other aspects of the operation of the cache 104. For example, in one embodiment the other control bits 345 can control whether the cache 104 is enabled or disabled. In the disabled state, the cache 104 will not respond to accesses, or will indicate all accesses as cache misses.

Referring again to FIG. 1, the cache coherency module 118 receives cache probes and other coherency accesses from other caches and system memory of the processor unit 102. A cache probe requests coherency information from a cache line designated by the probe. For example, the cache probe can request whether the cache 104 stores data associated with a particular memory address and, if so, whether that data is indicated as valid, exclusive, or in some other coherency state. Other coherency accesses can indicate that data associated with a memory address has been modified at another cache or at system memory. In response, the cache control module 110 can modify the valid bit for a cache line associated with the memory address to indicate that data stored at the cache line is invalid.

Figure 4:
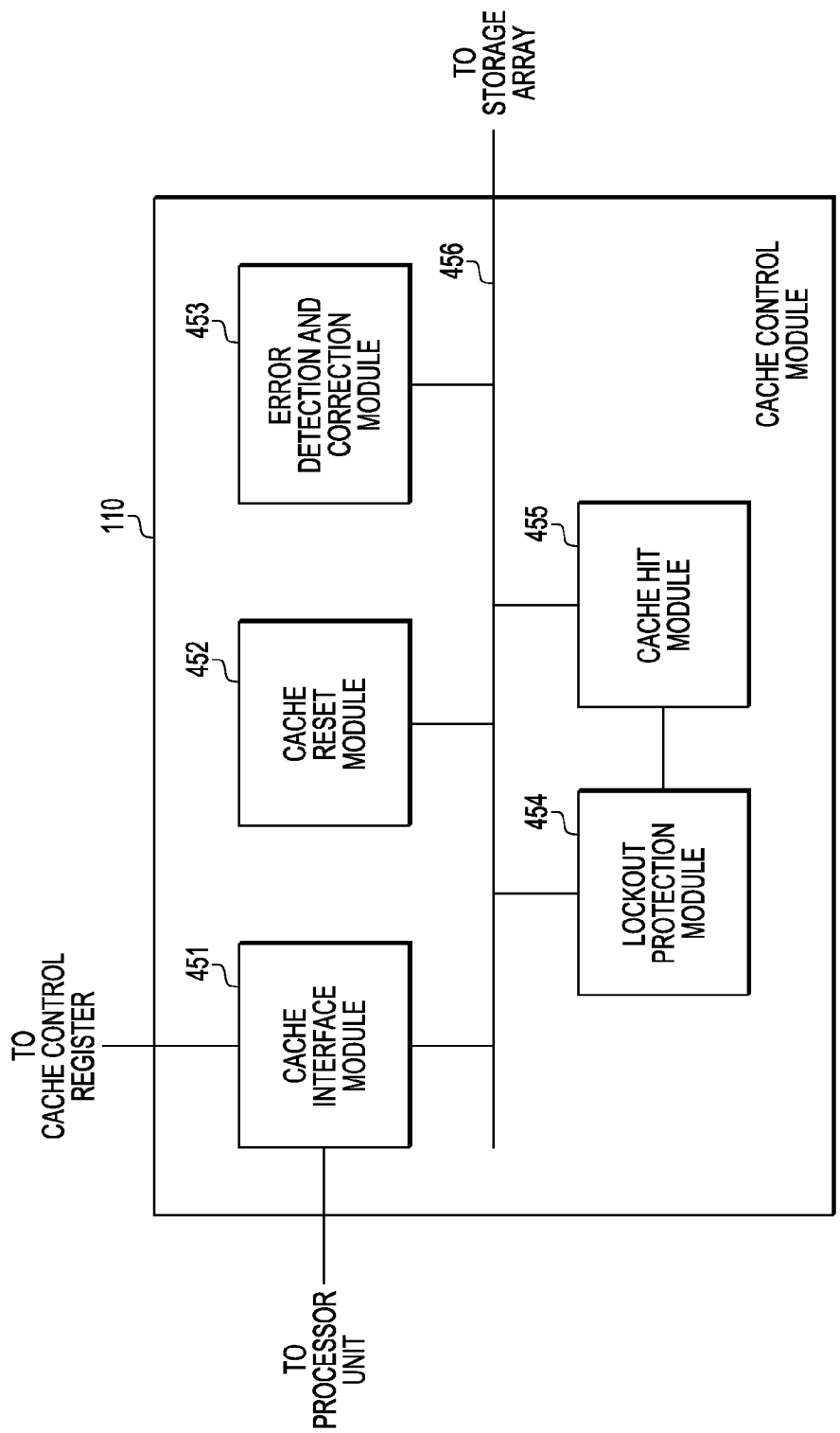
FIG. 4 is a block diagram of the cache control module of FIG. 1 in accordance with one embodiment of the present disclosure.

Referring to FIG. 4, a particular embodiment of the cache control module 110 is illustrated. The cache control module includes a cache interface module 451, a cache reset module 452, an error detection and correction module 453, a lockout protection module 454, a cache hit module 455, each connected to a bus 456. The bus 456 represents a communication medium that allows the modules of the cache control module 110 to communicate with each other and with the storage array 115. Accordingly, the bus 456 can be a serial or parallel bus, a set of point-to-point connections between modules, an interconnect, or other communication medium.

The cache interface module 451 provides an interface between the cache 104 and the processor unit 102. Accordingly, the cache interface module 451 receives accesses from the processor unit 102 and controls the operation of the other modules of the cache control module 110 in response to each access. To illustrate, in response to an access, the cache interface module 451 decodes address information associated with the access to determine a tag. The cache interface module 451 provides the tag to cache hit module 455. The cache interface module 451 also determines whether to generate an interrupt in response to an error being detected based on a cache access.

The cache hit module 455 receives each tag provided by the cache interface module 451 and determines whether the storage array 116 includes a valid cache line associated with the tag. If not, the cache hit module 455 indicates a cache miss to the cache interface module 451. If there is a valid cache line associated with the tag, the cache hit module 455 prepares to indicate a cache hit. In response, the cache interface module 451 determines whether the lockout policy for the cache 104, as indicated at the cache control register 112, indicates that lockout protection is enabled for the cache 104. If lockout is not enabled, the cache interface module 451 commands cache hit module 455 to route all cache hits to directly to the cache interface module. If lockout protection is enabled, the cache interface module 451 commands the cache hit module 455 to route an indicated cache hit(s) to the lockout protection module 454.

The lockout protection module 454 determines, for each cache line that indicated the hit, whether the lockout bits associated with the cache line are in the locked-out state. If not, the lockout protection module 454 indicates a cache hit to the cache interface module 451. If the lockout bits are in the locked-out state for a cache line that indicated a cache hit, the lockout protection module indicates a cache miss to the cache interface module 451 for that cache line. In normal operation, only a single non-locked-out cache line is allowed to generate a cache hit. A locked out cache line can appear to generate a cache hit but, because the cache hit is not indicated to the cache interface module 451, the locked-out cache line is prevented from satisfying an access request.

In response to a cache hit, the cache interface module 451 executes the access at the indicated cache line. Accordingly, for write accesses, the cache interface module stores data associated with the access at the cache line that resulted in the cache hit. For read accesses, the cache interface module 451 determines whether error detection is enabled for the cache 104. If not, the cache interface module 451 retrieves the data requested by the read access from the storage array 116 and provides it to the processor unit 102. If error detection is enabled, the cache interface module 451 retrieves the data and provides it to the error detection and correction module 453.

The error detection and correction module 453 performs error detection on the retrieved data and, if an error is detected, determines if it can correct the error. For example, in an embodiment the error detection and correction module 453 can correct only single-bit errors. For those errors that can be corrected, the error detection and correction module 453 corrects the errors. Corrected data, or data for which no errors are detected, is provided to the cache interface module 451 for transfer to the processor unit 102. For uncorrectable errors, the error detection and correction module 453 notifies the cache interface module 451, which can lockout the cache line associated with the error, and also generate an exception in response to the error, based on the lockout control bits 342 (FIG. 3).

In response to an indication from the error detection and correction module 453, the cache interface module 451 determines, based on the lockout policy, whether to generate an interrupt. The cache interface module 451 can also, based on the lockout policy, recycle a cache access that resulted in the error by resending the tag to the cache hit module 456.

The cache reset module 452 is configured to reset the state of the valid bits and the lockout bits at the storage array 115 depending on the lockout reset policy bits and VB reset policy bits stored at the cache control register 112. In particular, in response to an indication of a reset event at the processor unit 102, the cache reset module 452 determines if the VB reset policy is the invalidate policy or the protect policy. If the policy is the invalidate policy, the cache reset module 452 modifies the state of each valid bit at the storage array 115 to indicate that the corresponding cache lines are invalid. If the policy is the protect policy, the cache reset module 452 maintains the state of each valid bit by not modifying the bits.

Similarly, in response to an indication of a reset event at the processor unit 102, the cache reset module 452 determines if the lockout reset policy is the invalidate policy or the protect policy. If the policy is the invalidate policy, the cache reset module 452 modifies the state of each lockout bit at the storage array 115 to indicate that the corresponding cache lines are not in the locked-out state. If the policy is the protect policy, the cache reset module 452 maintains the state of each lockout bit by not modifying the bits.

Figure 5:
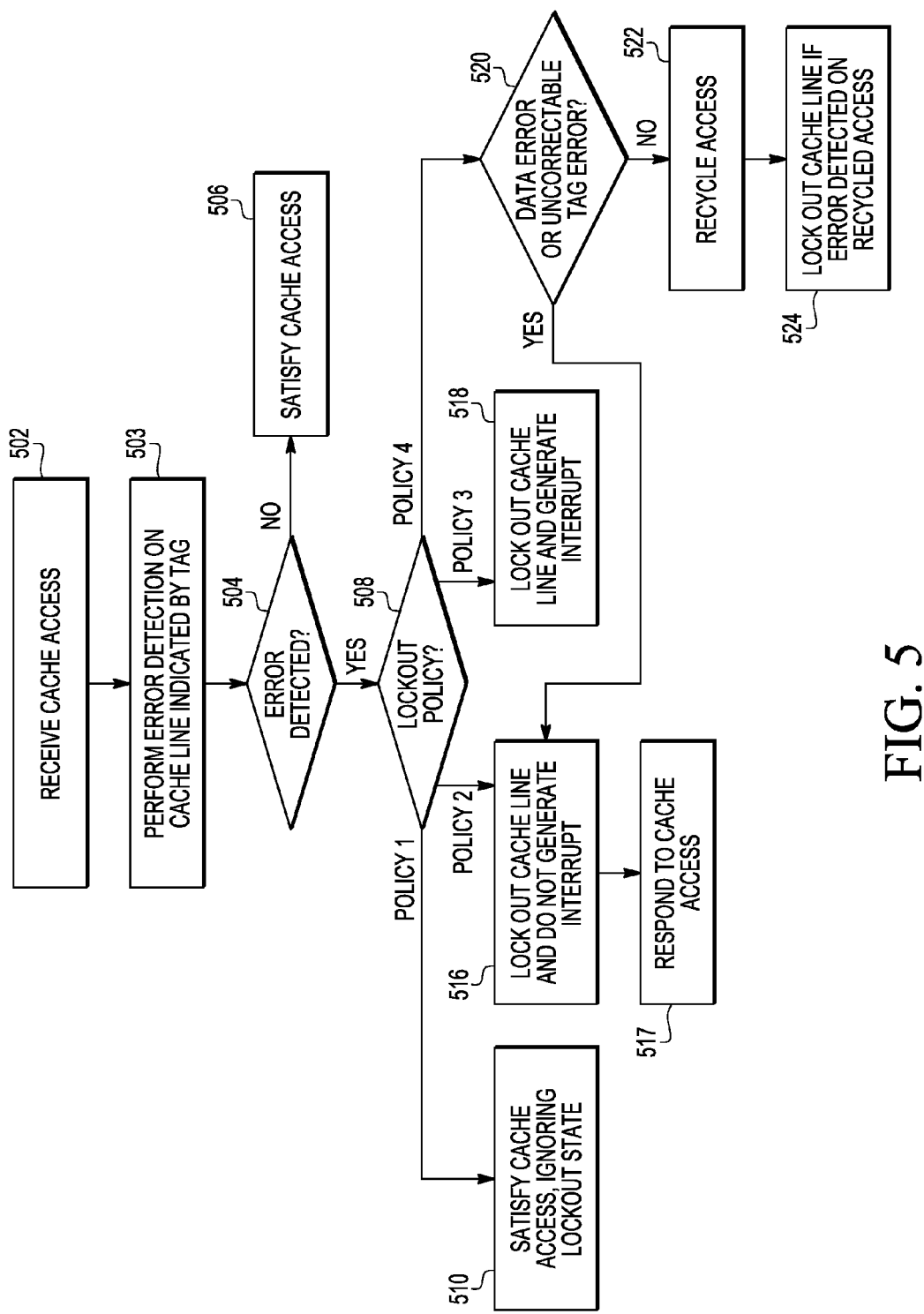
FIG. 5 is a flow diagram of a method of managing a lockout policy at the data processing device of FIG. 1 in accordance with one embodiment of the present disclosure.

FIG. 5 illustrates a flow chart of a method of implementing a programmable cache lockout policy at the data processing device 100 in accordance with one embodiment of the present disclosure. At block 502, the cache 104 receives a cache access and decodes the address information associated with the access to determine a tag. The tag is employed to retrieve a cache line of the storage array 115. At block 503, the cache control module 110 performs error detection on the retrieved cache line and, at block 504 determines whether an error has been detected at the stored tag and data information. If not, the method flow proceeds to block 506 and the cache control module 110 satisfies the cache access by either modifying the data stored at the cache line (for a write access) or by providing the data to the processor unit 102 (for a read access).

If an error is detected in the retrieved information the method flow proceeds to block 508 and the cache control module determines, based on the lockout control bits at the cache control register 112, the lockout policy for the data processing device 100. If the lockout policy is Policy 1, the method flow proceeds to block 510 and the cache control module 110 satisfies the cache access, ignoring the lockout state of the cache line and without modifying the lockout state. If the lockout policy is Policy 2, the method flow moves to block 516 and the cache control module 110 locks out the cache line by placing the lockout bits associated with the cache line in the locked-out state. In addition, the cache control module does not generate an interrupt. The method flow moves to block 517 and the cache control module 517 responds to the cache access. In an embodiment, the response indicates that an error was detected based on the access. The response is not an interrupt, and does not result in the execution of a machine check or other interrupt service routine.

Returning to block 508, if the lockout policy is Policy 3, the method flow proceeds to block 518 and the cache control module locks out the cache line and generates an interrupt for the processor unit 102. If the lockout policy is Policy 4, the method flow moves to block 520 and the cache control module 110 determines if the detected error was located at the data stored at the cache line, or if the detected error was located at the tag and is also an uncorrectable error. If either condition is true, the method flow moves to block 516 and the cache control module 110 locks out the cache line by placing the lockout bits associated with the cache line in the locked-out state. In addition, the cache control module does not generate an interrupt. If, at block 520, the cache control module determines that the detected error is a correctable error located at the tag stored at the cache line, the method flow moves to block 522 and the cache control module 110 recycles the cache access by attempting to satisfy the access again, following an attempted correction of the cache line contents. In particular, the address is again decoded to determine a tag and the information stored at the cache line associated with the tag is again retrieved. Error detection and correction are again performed on the retrieved information. At block 524 the cache control module 110 locks out the cache line if an error is detected for the recycled access. If no error is detected for the recycled access, the cache control module 110 satisfies the received cache access.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

As used herein, the term "first" can refer to any selected item, and does not necessarily refer to first in time or first in a particular order. Thus, for example, the term "first checkbit" can refer to any one of a set of checkbits, and does not refer to the placement of a checkbit in time or order.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a data processing device comprising a processor unit coupled to a cache comprising a plurality of cache lines, a method comprising:
   in response to a first cache access to a first cache line of the plurality of cache lines:
      when a lockout policy for the cache is a first policy, generating an interrupt at the data processing device and setting a lockout indicator to a first state in response to detecting a first error in information stored at the first cache line; and
      when the lockout policy for the cache is a second policy, responding to the first cache access without generating the interrupt, and setting the lockout indicator to the first state in response to detecting the first error; and
   in response to a second cache access to the first cache line, preventing the first cache line from satisfying the second cache access when the lockout indicator is in the first state.

2. The method of claim 1, further comprising:
   when the lockout policy for the cache is a third policy, responding to the first cache access without generating the interrupt and maintaining the lockout indicator in a second state in response to detecting the first error.

3. The method of claim 1, further comprising:
   when the lockout policy is a third policy:
      generating an interrupt at the data processing device in response to detecting the first error; and
      setting the lockout indicator to the first state in response to determining the first error is an uncorrectable error.

4. The method of claim 3, wherein determining the error is an uncorrectable error comprises determining the first error is a multi-bit error.

5. The method of claim 3, further comprising:
   when the lockout policy is the third policy:
      maintaining the lockout indicator in a second state in response to determining the first error is a correctable error;
      recycling the access in response to detecting the first error; and
      setting the lockout indicator in response to detecting a second error in response to the recycled access.

6. The method of claim 5, wherein the first error comprises an error in tag information associated with the first cache line.

7. The method of claim 1 wherein further comprising satisfying the second cache access from the first cache line when the lockout indicator is in the second state.

8. The method of claim 1, further comprising determining the lockout policy based on information stored at a register.

9. The method of claim 1, wherein the first error comprises an error at tag information associated with the first cache line.

10. The method of claim 1, wherein the first error comprises an error at data stored at the first cache line, the data different from tag information associated with the first cache line.

11. The method of claim 1, wherein the lockout indicator comprises a plurality of redundant indicators.

12. A method, comprising:
   in response to receiving a cache access comprising a read access or a write access at a cache, determining a lockout policy for the cache;
   in response to determining the lockout policy is a first policy, generating an interrupt and setting a lockout indicator to a first state when a first error is detected in response to the cache access;
   in response to determining the lockout policy is a second policy, responding to the cache access without generating the interrupt and setting the lockout indicator to the first state when the first error is detected; and
   determining whether to indicate a cache hit based on the state of the lockout indicator.

13. The method of claim 12, further comprising:
   in response to determining the lockout policy is a third policy, maintaining the lockout indicator in a second state in response to detecting the first error.

14. The method of claim 12, wherein responding to the cache access comprises indicating an error was detected to a processor unit.

15. The method of claim 12 wherein the interrupt comprises a machine check interrupt.

16. A device, comprising:
   a processor unit;
   a cache comprising a plurality of cache lines including a first cache line; and
   a cache control module configured to, when a lockout policy is a first policy, set a state of a lockout indicator for the first cache line to a first state and generate an interrupt when a first error is detected based on a cache access, and when the lockout policy is a second policy, set the state of the lockout indicator to the first state without generating the interrupt when the first error is detected based on the cache access;

the cache control module configured to prevent the first cache line from satisfying cache accesses when the lockout indicator is in the first state.

17. The device of claim 16, wherein the cache control module is configured to, in response to determining the lockout policy for the cache is a third policy, respond to the cache access without generating the interrupt and maintain the lockout indicator in a second state in response to detecting the first error.

18. The device of claim 16, wherein the cache control module is configured to, in response to determining the lockout policy for the cache is a third policy:

generate an interrupt at the data processing device in response to detecting the first error; and set the lockout indicator to the first state in response to determining the first error is an uncorrectable error.

19. The device of claim 16, wherein the cache control module is configured to determines the first error is an uncorrectable error comprises in response to determining the first error is a multi-bit error.

20. The device of claim 16, wherein the cache control module comprises an error detection and correction module configured to detect the first error.

* * * * *